United States Patent
Khafagy et al.

(10) Patent No.: US 10,322,042 B2
(45) Date of Patent: Jun. 18, 2019

(54) METHODS AND SYSTEMS FOR OPERATING A MOBILITY SERVICE VEHICLE

(71) Applicant: Ford Global Technologies, LLC, Dearborn, MI (US)

(72) Inventors: Hafiz Shafeek Khafagy, Dearborn, MI (US); Siraj Siddiqui, Lasalle (CA); Ahmed Awadi, Farmington Hills, MI (US); Ben Bulat, Plymouth, MI (US); Joshua Norwood, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 15/610,835

(22) Filed: Jun. 1, 2017

(65) Prior Publication Data

US 2018/0344545 A1    Dec. 6, 2018

(51) Int. Cl.
*A61G 3/06* (2006.01)
*B60P 1/44* (2006.01)
*B66F 9/075* (2006.01)

(52) U.S. Cl.
CPC .............. *A61G 3/062* (2013.01); *B60P 1/445* (2013.01); *B66F 9/07572* (2013.01)

(58) Field of Classification Search
CPC .......... A61G 3/06; A61G 3/062; A61G 3/067; B60P 1/43; B60P 1/431; B60P 1/4414; B60P 1/445; B66F 9/07572
See application file for complete search history.

(56) References Cited

U.S. PATENT DOCUMENTS

| | | | |
|---|---|---|---|
| 4,420,286 A * | 12/1983 | Hanson | A61G 3/06 414/539 |
| 4,804,308 A * | 2/1989 | Hamblin | B66B 9/00 414/537 |
| 5,653,659 A | 8/1997 | Kunibe et al. | |
| 6,504,259 B1 | 1/2003 | Kuroda et al. | |
| 6,532,926 B1 | 3/2003 | Kuroda et al. | |
| 6,594,565 B1 * | 7/2003 | Schafer | B60P 1/4471 701/36 |
| 6,825,628 B2 * | 11/2004 | Heigl | A61G 3/061 318/266 |
| 6,947,827 B2 | 9/2005 | Fuse et al. | |
| 7,186,205 B2 * | 3/2007 | Lahr | A61G 3/06 477/97 |

(Continued)

FOREIGN PATENT DOCUMENTS

CN    101480948 A    7/2009

OTHER PUBLICATIONS

"How It Works: Air Ride Suspension," YouTube Website, Available Online at https://www.youtube.com/watch?v=tEbqpZa-UPM, Feb. 3, 2013, 4 pages.

*Primary Examiner* — Laura Freedman
(74) *Attorney, Agent, or Firm* — Julia Voutyras; McCoy Russell LLP

(57) ABSTRACT

Methods and systems are provided for operation of a lifting mechanism coupled to a mobility service vehicle. In one example, a method may include, during an engine idle-stop, in response to a request for operation of a lifting mechanism used by mobility devices to access the vehicle, the transmission may be shifted to park, an electronic braking system may be enabled, and the engine may be restarted to provide power for operation of the lifting mechanism.

20 Claims, 5 Drawing Sheets

(56) References Cited

U.S. PATENT DOCUMENTS

| | | | |
|---|---|---|---|
| 7,274,980 B1 * | 9/2007 | Schafer | B60P 1/4471 |
| | | | 701/36 |
| 7,632,058 B2 * | 12/2009 | Ablabutyan | B60P 1/4442 |
| | | | 414/546 |
| 8,998,558 B2 * | 4/2015 | Kitchin | A61G 3/06 |
| | | | 280/6.152 |
| 9,101,519 B2 * | 8/2015 | Smith | A61G 3/061 |
| 9,206,780 B2 | 12/2015 | Renner | |
| 2008/0147260 A1 | 6/2008 | Moran | |
| 2010/0332085 A1 | 12/2010 | Song et al. | |

* cited by examiner

METHODS AND SYSTEMS FOR OPERATING A MOBILITY SERVICE VEHICLE

FIELD

The present description relates generally to methods and systems for controlling operation of a lifting mechanism coupled to a mobility service vehicle.

BACKGROUND/SUMMARY

Vehicles may be equipped with lifting mechanisms such as ramps and chairlifts for facilitating access of a physically impaired person using a mobility device such as a wheelchair. In response to a command by an operator, a ramp may be lowered from an open vehicle door to reach a pavement. Once the ramp has been used by the passenger to board the vehicle, the ramp may be folded and stowed under the floor of the vehicle cabin. Power from an on-board hydraulic system and/or an electric motor may be used for operating the lifting mechanism. Engine power may be used to charge an on-board battery supplying power to the hydraulic system and/or the electric motor.

Various approaches are provided for operating a lifting mechanism in a vehicle. In one example, as shown in US20100332085, Song et al. teaches operation of a power ramp coupled to a vehicle. The power ramp is operated via a power generating device comprising a motor gear coupled to the ramp. The power ramp may be operated upon confirmation that the vehicle is stopped and is parked. Also, the operation of the ramp may be inhibited if the vehicle door is not opened.

However, the inventors herein have recognized potential issues with such systems. As one example, during an engine idle-stop, when the engine combustion is disabled, operation of the lifting mechanism may be requested and the state of charge (SOC) of a battery providing power to the lifting mechanism may not be sufficient for operating the lifting mechanism, thereby delaying operation of the lifting mechanism. Also, in the system of Song et al., during an engine idle-stop even if the vehicle is at rest, the lifting mechanism may not be operated if the vehicle is not at park (such as when the transmission position is not park). When the vehicle is parked on a slope, even with the transmission at park, the vehicle may roll and may not be stable enough to operate the lifting mechanism. If engine idle-stop conditions are met and a request for operation of the lifting mechanism is received, the engine may shut down without providing the power needed for operating the lifting mechanism, thereby delaying operation of the lifting mechanism.

In one example, the issues described above may be addressed by a method for a vehicle comprising: responsive to a driver request for operating a lifting mechanism coupled to the vehicle received while an engine is at rest, shifting a transmission into a park position, restarting the engine, and then operating the lifting mechanism. In this way, engine idle-stop operations may be better coordinated with the operation of a lifting mechanism.

As one example, a lifting mechanism may be coupled to a body of a mobility vehicle, the lifting mechanism enabling a passenger using a mobility device (such as wheelchair) to enter and exit the vehicle. The lifting mechanism may be actuatable vertically and/or horizontally relative to the body of the vehicle. In response to engine idle-stop conditions being met (such as in response to a longer than threshold duration of engine idling), an engine idle-stop may be initiated wherein cylinder combustion may be temporarily suspended and the engine is spun to rest. During engine rest, if operation of a lifting mechanism is requested while the vehicle is stationary, such as to load or unload a wheelchair-bound passenger, the controller may automatically restart the engine in order to charge an electric battery used for supplying power to the lifting mechanism. If the transmission of the vehicle is not at park, before restarting the engine, the transmission gear may be shifted to park so that the vehicle can be held at rest. Further, before restarting the engine, the electronic park brake may be engaged before operating the lifting mechanism. Once it is confirmed that the vehicle is at rest, the transmission is at park, the electric parking brake is enabled, and the engine has been restarted, the lifting mechanism may be operated. During the engine restart, the electric battery may also be used to operate the starter motor to crank the engine. During engine cranking, if operation of an auxiliary vehicle system, such as the air suspension system, is also requested, the operation of the auxiliary system may be delayed until the engine cranking is complete (e.g., until the engine speed is at or above a target cranking speed). If the request for operating the lifting mechanism is received prior to the engine idle-stop being initiated, even if all other idle-stop conditions are met and the vehicle is at rest, the engine idle-stop may be temporarily overridden and engine operation may not be stopped. Instead, the transmission gear may be shifted to park and the electronic park brake may be enabled so that the lifting mechanism can be operated. Once operation of the lifting mechanism is completed, the engine idle-stop may be resumed, the transmission may be shifted out of park (e.g., to a default idle-stop position or the position it was in prior to the receiving the request for operation of the lifting mechanism), and the electronic parking brake may be disabled.

In this way, operation of a lifting mechanism may be coordinated with engine idle-stop and restart events so as to give priority to the operation of the lifting mechanism. In response to a request for operation of a lifting mechanism received during an engine idle-stop, by first shifting the transmission gear position to park, via an engine controller, before operating the lifting mechanism, the possibility of vehicle movement during operation of the lifting mechanism may be reduced. By also engaging the electronic park brake before operating the lifting mechanism, even if the vehicle is parked on a slope, rolling of the vehicle may be reduced. By resuming the original transmission position after operation of the lifting mechanism is completed, vehicle operation may be seamlessly resumed. The technical effect of actively restarting an engine from an idle-stop in response to a request for operation of a lifting mechanism is that engine power may be used to effectively operate the lifting mechanism. By restarting the engine, reliance on battery state of charge during operation of the lifting mechanism may be reduced. By delaying engine shutdown even when the conditions for an engine idle-stop are met, operation of the lifting mechanism may be expedited. By postponing operation of any auxiliary vehicle system such as the air suspension system during engine cranking, the battery charge may be used to efficiently crank the engine within a shorter time and to start operating the lifting mechanism. In this way, a lifting mechanism may be operated while engine start-stop operations are performed to improve vehicle fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
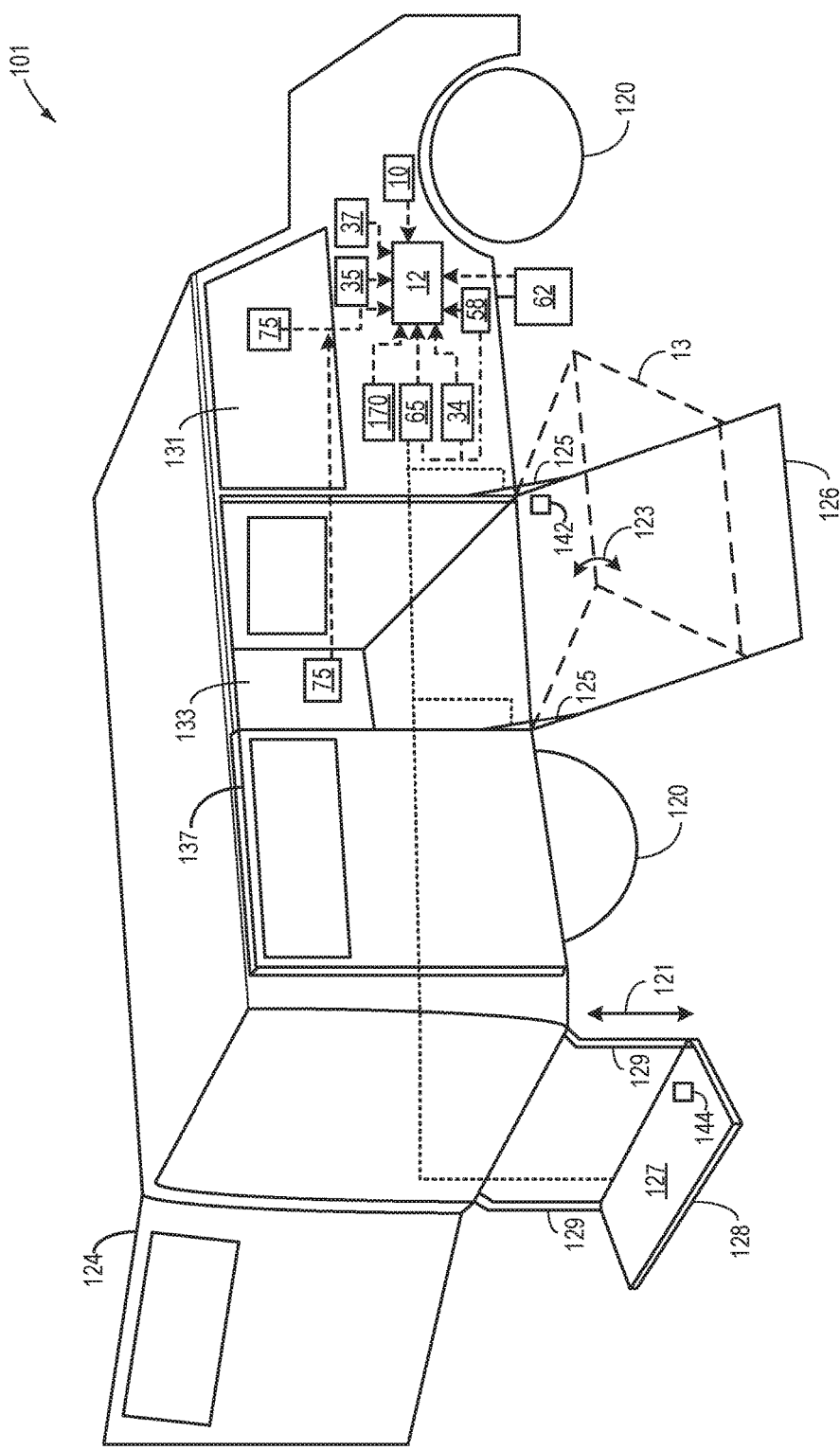
FIG. 1 shows an example mobility vehicle system.
Figure 2:
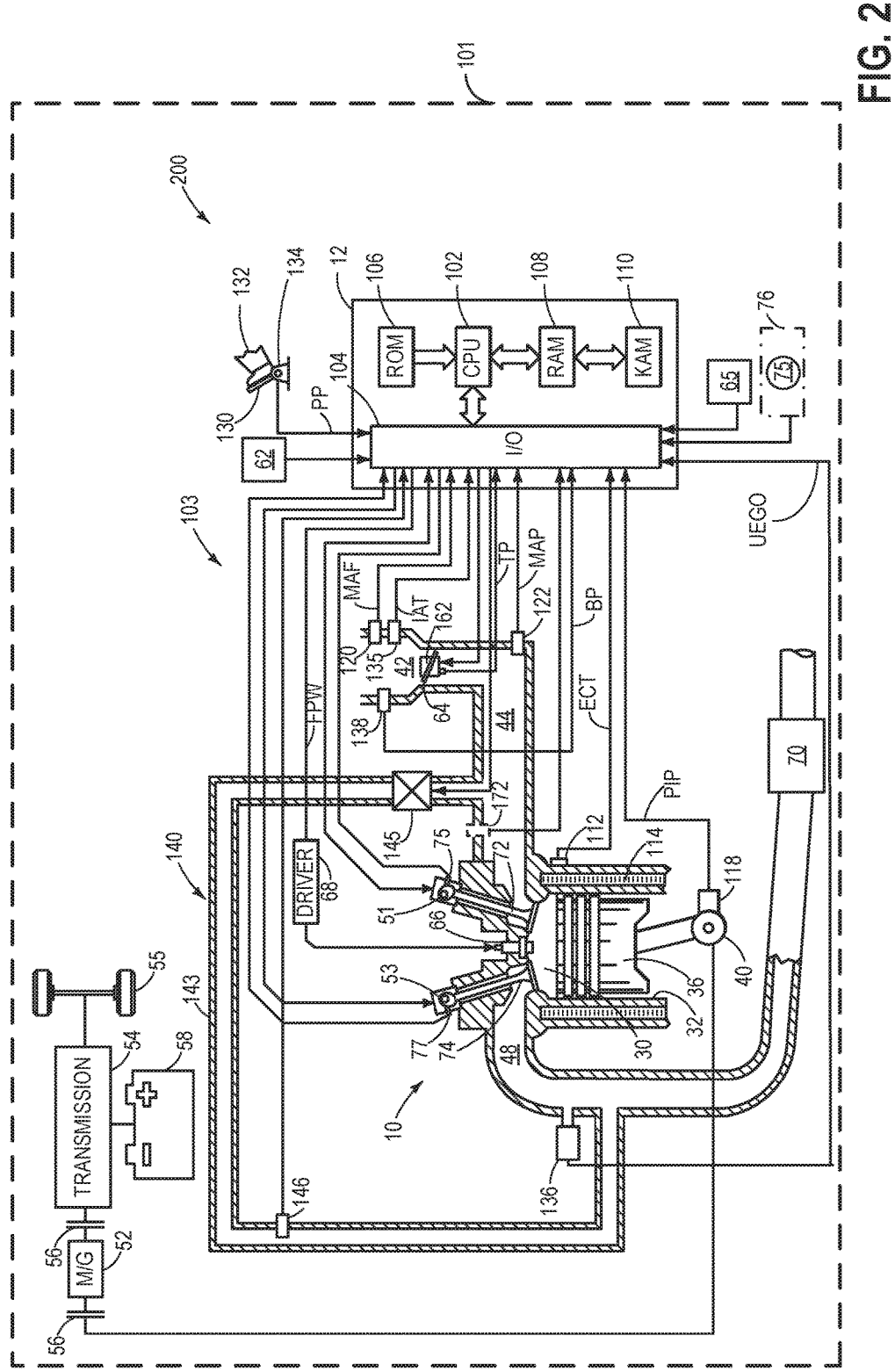
FIG. 2 shows an example engine system of the mobility vehicle system of FIG. 1.

The following description relates to systems and methods for controlling operation of a vehicle fitted with a lifting mechanism. An example vehicle (herein referred to as a mobility vehicle) equipped with a lifting mechanism is shown in FIG. 1 and an example engine system of the mobility vehicle is shown in FIG. 2. An engine controller may be configured to perform control routines, such as example routines of FIGS. 3 and 4, to adjust operation of each of the engine system and the transmission system of a mobility vehicle to operate a lifting mechanism. An example operation of the engine system and the transmission system of a mobility vehicle during an engine idle-stop is shown in FIG. 5.

FIG. 1 shows an example mobility vehicle 101 fitted with a plurality of lifting mechanisms. The mobility vehicle 101 may be an on-road operated passenger vehicle equipped to transport passengers using mobility devices, such as a wheel chair, scooter, etc. The vehicle 101 may comprise wheels 55, doors including a passenger door 137 and a rear door 124, and a vehicle cabin divided into a driver compartment 131 and a passenger compartment 133. The passenger door 137 may be opened by sliding the door along a frame or body of the vehicle while the rear door may be opened by swinging it away from the body of the vehicle cabin. In addition to the doors shown in FIG. 2, there may be additional doors to access the driver compartment 131 and the passenger compartment 133.

A first lifting mechanism, herein depicted as a ramp 126, may be fitted to the passenger compartment 133 to provide access to mobility devices such as wheelchairs. The ramp 126 may allow the mobility device to access the passenger compartment 133 via the passenger door 137. A switch 75 located in a dashboard of the driver compartment 131 may be used to activate operation of the ramp 126. Additionally, a switch 75 may be provided in the passenger compartment 133 to allow a passenger to request operation of the ramp 126. A second lifting mechanism, herein depicted as a chairlift 128, may also be fitted to the passenger compartment 133 to provide access to mobility devices such as wheelchairs. The chairlift 128 may allow the mobility device to access the passenger compartment 133 via the rear door 124. The switch 75 located in the dashboard of the driver compartment 131 and/or in the passenger compartment 133 may allow a passenger to request operation of the chairlift 128. In one example, when the switch 75 is in a first position, operation of each of the ramp 126 and the chairlift 128 is not requested, when the switch 75 is in a second position, operation of only the ramp 126 is requested, when the switch 75 is in a third position, operation of only the chairlift 128 is requested, and when the switch 75 is in a fourth position, concurrent operation of the ramp 126 and the chairlift 128 is requested. In another example, separate switches may be provided corresponding to each of the ramp 126 and the chairlift 128. In one example, the switch 75 may be a hard switch. In another example, the switch 75 may be a soft switch that may be selected from a menu option included in a user interface. In yet another example, the switch 75 may be included in a key fob and may be activated from within or outside the vehicle 101.

When not in operation, the ramp 126 may be stored in a folded state on the floor of the passenger compartment 133. When not in operation, the chairlift 128 may be stored on the floor of the passenger compartment 133 in a folded position. Upon receiving a request to operate the ramp 126 and/or the chairlift 128 via the switch 75, the controller 12 may first verify if the vehicle is at rest. The ramp 126 and/or the chairlift 128 may not be operated if the vehicle is not at rest and the operator may be notified via a user interface (e.g., a display in the driver compartment) to bring the vehicle to rest before the operation of the ramp 126 and/or the chairlift 128 may be initiated. In one example, an on-board hydraulic system 65 may be used to operate the ramp 126 and/or the chairlift 128. In another example, an on-board electric motor 34 may be used for operating the lifting mechanisms. Engine power may be used to charge an on-board battery 58 supplying power to the hydraulic system 65 and/or the electric motor 34 for operation of the lifting mechanism. Therefore, during operation of the ramp 126 and/or the chairlift 128, the engine 10 may be operated to supply the desired power to the hydraulic system 65 and/or the electric motor. Further, in order to ensure that the vehicle is stationary and does not move during operation of the lifting mechanism, the transmission may be shifted to park and an electronic brake 37 may be enabled by the controller 12 prior to initiating operation of the lifting mechanisms. The electronic park brake may be different from a mechanical brake 35, the mechanical brake 35 may be actuated by an operator and the electronic brake 37 may be engaged via the controller irrespective of the position of the mechanical brake. Details of operation of the operation of the lifting mechanisms is discussed in FIGS. 3 and 4.

Once it is confirmed that the vehicle is at rest, the engine 10 is running, the transmission is at park, and the electronic brake is enabled, the controller may open the door corresponding to the ramp 126 and/or the chairlift 128 (e.g., by opening the passenger door 137 before operating the ramp 126 and/or by opening the rear door 124 before operating the chairlift 128) and send a signal to an on-board hydraulic system 65 and/or the electric motor 34 to hydraulically and/or electrically actuate the ramp 126 and/or the chairlift 128. In one example, the hydraulic system 65 may operate a first pair of shafts (hydraulic actuators) 125 to move the ramp 126 from a position where it is stowed within the vehicle cabin (such as from the floor of the vehicle cabin) and unfold the ramp 126 to extend it from the vehicle onto a roadside. In another example, the electric motor 34 may operate the first pair of shafts 125 to move the ramp 126 from the position where it is stowed within the vehicle cabin and unfold the ramp 126 to extend it from the vehicle onto a roadside. Once the ramp 126 touches the road, a mobility device such as a wheel chair may be rolled up the ramp to enter the passenger compartment 133. After the mobility device has entered the passenger compartment 133 and has been secured in place, the ramp 126 may be folded and stored within the vehicle cabin to complete the operation of the lifting mechanism. Dotted lines 13 show the intermediate state of the ramp 126 during folding and unfolding, and arrow 123 shows a direction of folding and unfolding of the ramp 126. A ramp position sensor 142 may be coupled to the ramp to estimate a position of the ramp relative to the vehicle 101 and the road.

Similarly, the hydraulic system 65 and/or the electric motor 34 may hydraulically and/or electrically actuate a second pair of shafts 129 to move the chairlift 128 from a position where it is stowed within the vehicle cabin (such as from the floor of the vehicle cabin) and then lower the base 127 of the chairlift to extend it from the vehicle onto a roadside. Once the base 127 of chairlift 128 reaches the road, a mobility device such as a wheel chair may roll onto the base of the chairlift and then once the mobility device is on the base 127, the chairlift 128 may be raised to the level of the floor of the passenger compartment 133 and the mobility device may enter the passenger compartment 133 from the chairlift base 127. Once the mobility device has entered the passenger compartment 133 and has been secured in place, the chairlift 128 may be stored within the vehicle cabin to complete the operation of the lifting mechanism. Arrow 121 shows a direction of downward (during lowering) and upward (during raising) movement of the chairlift 128. A chairlift position sensor 144 may be coupled to the chairlift 128 to estimate a position of the chairlift 128 relative to the vehicle 101 and the road.

The mobility vehicle 101 may further include an air compression system 62 to maintain a desired height of the vehicle. The air suspension system may include various components, such as a plurality of air springs, a plurality of solenoid valves corresponding to each air spring, a compressor, and a dryer. When the weight of the vehicle increases, such as when passengers and/or mobility devices (such as wheel chairs) enter the vehicle, a distance of the vehicle floor from the ground level (herein also referred to as the floor height of the vehicle) may decrease due to the added weight. In order to increase the floor height of the vehicle and then maintain the floor height of the vehicle at the desired level, the compressor may pump air to one or more air springs via the dryer. The solenoids corresponding to each air spring may open to allow the air to enter the air spring. As air enters the air springs, the height of the springs may be adjusted, such as increased, thereby increasing the overall height of the vehicle. The controller may determine the amount of air to be pumped by the compressor to the air springs based on a difference between an actual floor height of the vehicle and the desired floor height of the vehicle. In one example, in response to an increase in the difference between the actual floor height of the vehicle and the desired floor height of the vehicle, the amount of air to be pumped to the air springs may be increased (more air to be pumped to the springs). In another example, in response to a decrease in the difference in height between the actual height of the vehicle and the desired height of the vehicle, the amount of air to be pumped to the air springs may be decreased (less air to be pumped to the springs). When the weight of the vehicle decreases, such as when passengers and/or mobility devices (such as wheel chairs) exit the vehicle, the height of the vehicle may increase as the position of the air springs are previously adjusted to compensate for the weight. In order to decrease the height of the vehicle and then maintain the height of the vehicle at the desired level, the solenoids corresponding to air springs may be opened to allow the air to exit the air spring. As air exits the air springs, the height of the springs may be adjusted, such as decreased, thereby decreasing the overall floor height of the vehicle.

The air suspension system 62 may also be operated to adjust the height of the vehicle during operation of the ramp 126 and/or the chairlift 128. In one example, when the ramp 126 and/or the chairlift 128 is operated (such as lowered or raised), the height of the vehicle may be decreased by removing air from the air springs to lower the vehicle floor closer to the ground, thereby facilitating the ramp and/or the chairlift 128 reaching the roadside. Power to operate the compressor of the air suspensions system may be supplied by the on-board battery 58, also supplying power to the hydraulic system 65. Engine power may be used to charge an on-board battery 58 supplying power to the air suspension system 62.

In addition, the vehicle 101 may include other auxiliary systems such as an air-conditioning system 170 which may use engine power during operation. During an engine idle-stop (while the engine is at rest), responsive to a driver request for air-conditioning, the transmission may be maintained in the driving gear, and the engine may be restarted, the engine restarted with the transmission maintained in the driving gear and the electronic parking brake disabled. Power from the engine may then be used to operate a compressor of the air-conditioning system 170.

FIG. 2 is a schematic diagram showing a vehicle system 200 comprising a vehicle 101 and an engine system 103. FIG. 2 shows one cylinder of a multi-cylinder engine 10 in the engine system 103. The vehicle 101 in FIG. 2 may be the mobility vehicle 101 of FIG. 1 and the engine 10 in FIG. 2 may be the engine 10 of FIG. 1. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 162 having a throttle plate 64. In this particular example, the position of throttle plate 64 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 135 and the barometric pressure (BP) sensor 138. The IAT sensor 135 estimates intake air temperature to be used in engine operations and provides a signal to the controller 12. Similarly, the BP sensor 138 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 136 is shown coupled to the exhaust passage 48 upstream of an emission control device 70. The sensor 136 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 136. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 143. The amount of EGR provided to the intake manifold 44 may be varied by the controller 12 via an EGR valve 145. Further, an EGR sensor 146 may be arranged within the EGR passage 143 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The vehicle 101 may include a dashboard 76. A switch 75 may be coupled to the dashboard to enable the vehicle operate to request operation of a lifting mechanism such as a ramp (such as ramp 126 in FIG. 1) and/or a lift (such as chairlift 128 in FIG. 1). If the mobility vehicle is equipped with more than one lifting mechanism, there may be dedicated switches for operating each lifting mechanism. In one example, a first switch may be activated by the operator to request operation of a ramp while a second switch may be activated by the operator to request operation of a lift. In addition to the switch 75 in the dashboard, there may be additional switches present in the vehicle 101, such as in the vehicle cabin, to request operation of a lifting mechanism. One or more lifting mechanisms may be fitted to the vehicle to provide access to mobility devices (such as wheel chairs) entering the driver compartment and/or the passenger compartment of the vehicle cabin. As described in relation to FIG. 1, an on-board hydraulic system 65 may be used for operating the lifting mechanisms.

During conditions when the operator torque demand decreases to below a threshold, such as when the vehicle is stopped at a traffic signal, the engine may idle until the torque demand increases. Prolonged idling may adversely affect fuel economy and emissions quality. As an example, engine idle-stop conditions may be met when a vehicle operates at a lower than threshold vehicle speed with brakes being applied.

In response to engine idle-stop conditions being met, an automatic start-stop (herein also referred to as engine idle-stop) operation may be carried out to reduce the duration of engine idling. For example, if it is determined that the engine has been idling for longer than a threshold duration, combustion may be suspended (by deactivating fuel and spark to engine cylinders), and engine operation may be stopped (idle-stop). In response to engine restart conditions being met, the engine may be restarted (idle-start) and combustion may be resumed.

While an engine is at rest during an idle-stop, responsive to a request for operating the lifting mechanism, the engine may be automatically restarted (even if idle-stop conditions are still present) with the transmission in park before operating the lifting mechanism. As an example, during engine rest (during an idle-stop), immediately before the request for operating the lifting mechanism, the transmission may be in drive, and the engine may be restarted and the transmission may be shifted from drive to park. Prior to operating the lifting mechanism, the controller may enable an electronic parking brake distinct from a driver-actuated mechanical brake, the electronic parking brake actuated independent of driver braking input. In one example, even when the driver-actuated mechanical brake is completely engaged, the electronic parking brake may be engaged by the controller prior to operation of the lifting mechanism. Upon completion of operation of the lifting mechanism, the electronic parking brake may be disabled, and a transmission position may be selected based on operator torque demand following the operation of the lifting mechanism. In one example, upon completion of operation of the lifting mechanism, the transmission position may be shifted to the original position (such as to a drive gear position) that the transmission was in immediately prior to the engine restart, and then the engine may be shut-down. Details of the operation of the lifting mechanism are discussed in FIGS. 3 and 4.

If a driver (or passenger) request for operating the lifting mechanism is received while the engine is running and engine idle-stop conditions are met, the transmission may be shifted into the park position, the electronic parking brake may be enabled, and the lifting mechanism may be operated while delaying the engine idle-stop until the operating of the lifting mechanism has been completed. In each case, operation of the lifting mechanism may only be initiated after the vehicle is brought to rest.

The controller 12 is shown in FIG. 2 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. The controller may receive signals from switch 75 actuated by the operator (or passenger) for operating the lifting mechanism. Position of the lifting mechanism may be inferred based on inputs from a ramp position and/or a lift position sensor. Further, this sensor, along with the detected engine speed, can provide an estimate of charge (including air) inducted into the cylinder.

The storage medium read-only memory 106 can be programmed with computer readable data representing non-transitory instructions executable by the processor 102 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to a lower than threshold engine load for a longer than threshold duration, the controller may initiate an engine idle-stop by sending a signal to the fuel injectors 66 to suspend engine cylinder fuel injection. In another example, during the engine idle-stop, in response to a request for operation of a lifting mechanism as received via the switch 75, the controller may restart the engine by sending a signal to the fuel injectors 66 to restart engine cylinder fuel injection, send a signal to the transmission system 54 to shift from an existing gear position to park, and actuate the hydraulic actuators of the lifting mechanism to operate the lifting mechanism.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation. In one example, battery 58 may supply power to a hydraulic system and/or an electric motor for operation of the lifting mechanism. In another example, a separate on-board battery (different from traction battery 58), charged using engine power may supply power to a hydraulic system and/or an electric motor for operation of the lifting mechanism. In this way, the systems of FIGS. 1 and 2 enable a system for a vehicle comprising: a vehicle including a vehicle cabin, a lifting mechanism coupled to the vehicle cabin, a hydraulic system coupled to the lifting mechanism, a dashboard including a switch electronically coupled to the lifting mechanism, a powertrain including an engine and a transmission, the engine coupled to an electric motor, an air-suspension system, a mechanical parking brake, an electronic parking brake, an air-conditioning system, and a controller with computer readable instructions stored on non-transitory memory for: in response to the switch being activated to request operation of the lifting mechanism while the engine is at rest in idle-stop, shifting the transmission from drive to park, enabling the electronic parking brake to bring the vehicle to rest, restarting the engine by cranking the engine via the electric motor, operating the lifting mechanism via the hydraulic system after engine speed is above a threshold speed, and upon completion of the operating, shutting down the engine and returning the engine to idle-stop.

Figure 3:
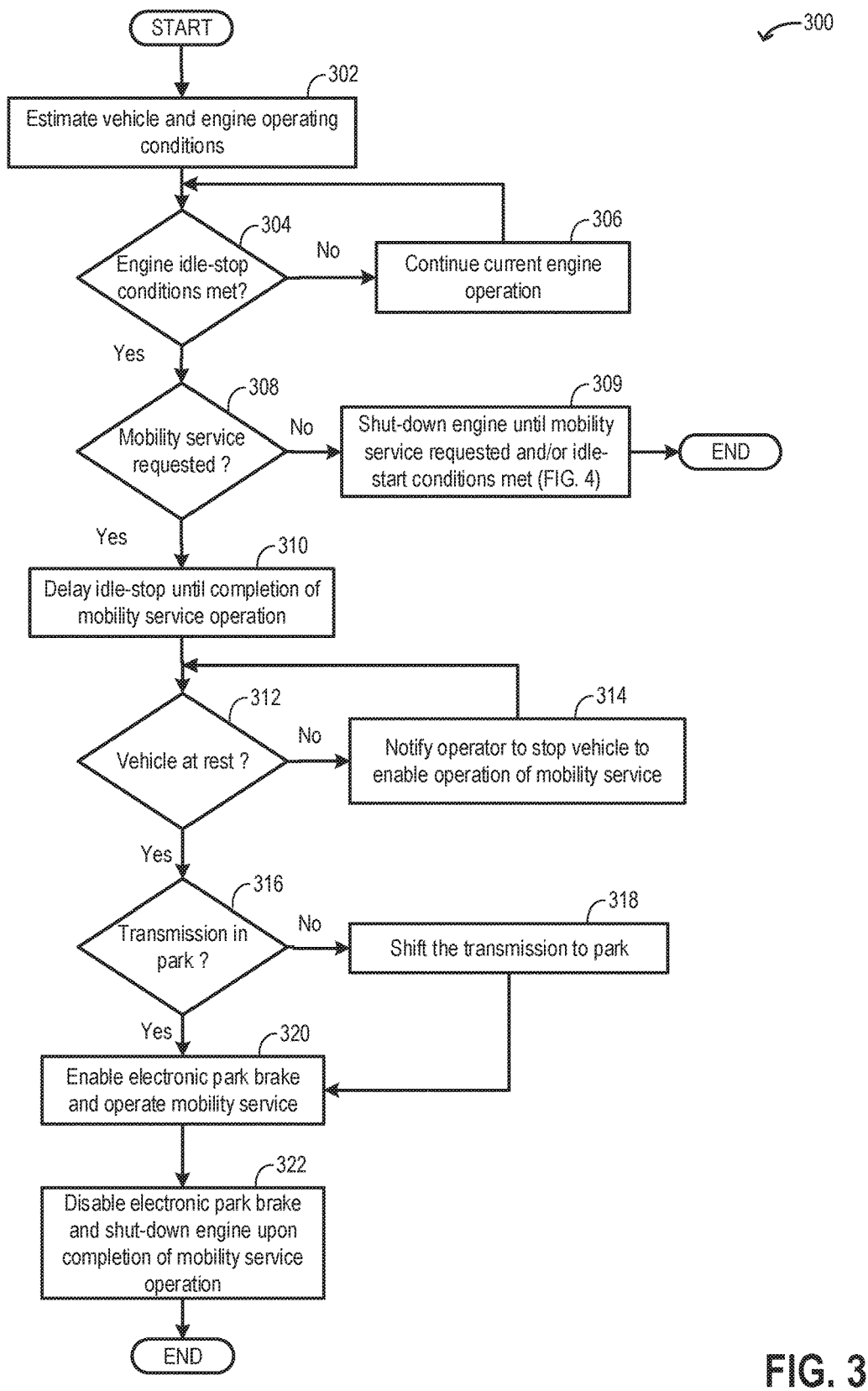
FIG. 3 shows a flow chart illustrating an example method that can be implemented to operate a lifting mechanism when an engine is running and engine idle-stop conditions are met.

FIG. 3 shows an example method 300 for adjusting an operation of each of the engine system and the transmission system of a mobility vehicle in response to engine idling conditions being met and operation of a lifting mechanism (herein also referred to as a mobility service) being requested. Instructions for carrying out method 300 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, manifold pressure, manifold air flow, battery state of charge, etc.

At 304, the routine includes determining if engine idle-stop conditions are met and if engine spin-down may be initiated. In one example, conditions for engine idle-stop may include engine idling for a longer than threshold duration. Engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. The threshold duration may be based on fuel level in the fuel tank. As an example, if the fuel level in the fuel tank is lower than a threshold level, the threshold duration may be decreased such that additional fuel may not be consumed for engine idling. In another example, conditions for engine idle-stop may include vehicle operation at a lower than threshold vehicle speed with brake being applied. Idle-stop during conditions when the vehicle speed is non-zero may be referred to as rolling idle-stop, such as when the vehicle is coasting with the operator foot off the pedal.

Engine idle-stop conditions may further include a greater than threshold battery state of charge (SOC). The controller may check battery SOC against a preset minimum threshold and if it is determined that the battery SOC is at least more that 30% charged, automatic engine stop may be enabled. Confirming engine idle-stop conditions may further include an indication that a motor of a starter/generator is operation ready. The status of an air conditioner may be checked and before initiating an engine idle-stop, it may be verified that the air conditioner did not issue a request for restarting the engine, as may be requested if air conditioning is desired. In one example, air conditioning may be desired if a temperature in the vehicle cabin increases above a desired temperature as indicated by the operator. In another example, the operator may initiate operation of the air conditioner by sending a command to the controller via a dashboard switch. The intake air temperature may be estimated and/or measured to determine if it is within a selected temperature range. In one example, the intake temperature may be estimated via a temperature sensor located in the intake manifold and an engine idle-stop may be initiated when the intake air temperature is above a threshold temperature. Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature. The driver requested torque may be estimated and confirmation of an engine idle-stop may be initiated in response to a lower than threshold driver requested torque. Further, an emission control device coupled to the exhaust manifold of engine may be analyzed to determine that no request for engine restart was made.

If it is determined that engine idle-stop conditions are not met, at 306, current engine operations may be continued without initiating the engine start-stop operation, such as the engine may be maintained running with cylinders combusting fuel. If it is determined that engine idle-stop conditions are met, at 308, the routine includes determining if operation of a lifting mechanism has been requested. The lifting mechanism may be coupled to a body of the vehicle, and the mechanism may enable a wheelchair bound passenger to enter and exit the vehicle, the lifting mechanism actuatable vertically and/or horizontally relative to the body of the vehicle. The lifting mechanism may include operation of one or more devices such as ramps and lifts fitted to the body of the vehicle. When the lifting mechanism is not in use, the ramps and lifts may be folded and stored underneath the floor of the vehicle. In one example, the operator of the mobility vehicle may request operation of a lifting mechanism by sending a command to the engine controller via a dashboard switch. In another example, a vehicle passenger may request the operation of a lifting mechanism by sending a command to the engine controller via a switch located in the vehicle cabin. In vehicles equipped with multiple lifting mechanisms, a position of a switch located in the dashboard or the vehicle cabin may indicate operation of which lifting mechanism has been requested. As such, a plurality of lifting mechanisms may be simultaneously operated. Besides being used to provide access to mobility devices such as wheel chairs, the ramp and/or lift may also be used to load and unload packages to and from a vehicle. Power from an on-board hydraulic system and/or an electric motor may be used for operating the lifting mechanisms. Engine power may be used to charge an on-board battery supplying power to the hydraulic system and/or the electric motor.

If it is determined that operation of a lifting mechanism is not requested, it may be inferred that supply of engine power to the on-board battery for operation of the lifting mechanism may not be currently desired. At 309, in response to the engine idle-stop conditions being met and the operation of a lifting mechanism not being requested, combustion may be suspended to shut-down the engine. The engine may then remain shut-down until operation of the lifting mechanism is requested and/or engine restart conditions are met. In order to suspend combustion, fueling to the engine cylinders may be suspended. The controller may send a signal to one or more fuel injectors coupled to the engine cylinders to stop fuel injection to each of the cylinders. Also, the controller may send a signal to the spark plug coupled to each cylinder to disable spark. In addition, cylinder valve operation may be suspended. Once the combustion is suspended, the engine may spin-down and the engine speed may gradually decrease to zero. Details of engine operation in response to a request for operation of a lifting mechanism during idle-stop is discussed in FIG. 4.

If it is determined that operation of a lifting mechanism has been requested, even if e engine idle-stop conditions are met, at 310, engine idle-stop (shut-down) may be delayed until completion of operation of the lifting mechanism. Current engine operations may be continued without initiating the engine idle-stop, for example, the engine may be maintained running with cylinders combusting fuel. The power generated by the engine may be used to charge the on-board battery.

At 312, the routine includes determining if the vehicle is at rest. In one example, idle-stop conditions may be met if the vehicle is operating at a lower than threshold vehicle speed. The controller may determine vehicle speed based on input from a vehicle wheel speed sensor. To improve the experience of a person using a mechanism mobility device, the vehicle is desired to be at complete rest during operation of the lifting mechanism.

If it is determined that the vehicle is not at rest and is operating at a non-zero speed, at 314, the operator may be notified, via an interface, to stop the vehicle in order to enable operation of the lifting mechanism. If it is determined that the vehicle is already at rest, at 316, the routine includes determining if the transmission is in park position. Even if the vehicle is at rest, the transmission may be in drive, neutral, or reverse position with the operator engaging the brake. If the transmission is not in park position, during operation of the lifting mechanism, the operator's foot may shift from the brake thereby causing the vehicle to move. As such, any vehicle motion may degraded the operation of the lifting mechanism. If it is determined that the vehicle transmission is not in park position, at 318, the controller may send a signal to the transmission system to change the transmission position from the current position (such as a drive position) to the park position. Herein, the transmission is automatically shifted to the park position, via the electronic controller, and independent of operator input. For example, even if the operator has selected a drive position of the transmission, the operator command may be overridden by the controller and the park position of the transmission may be selected. In one example, if the mobility vehicle is equipped with a manually shifted transmission, the operator may be notified via the interface to shift the transmission from the existing position to the park position to enable the operation of the lifting mechanism to be initiated.

Once the transmission is shifted to park at 318, or if the transmission is already in park at 316, the routine proceeds to step 320. At 320, the controller may enable the electronic park brake and then operate the mobility vehicle. The electronic park brake may be different from a mechanical brake that is actuated by an operator and the electronic park brake may be engaged via the controller irrespective of the position of the mechanical brake. For example, even if the operator has not requested vehicle braking via the mechanical brake pedal, the controller may apply the electronic brake to hold the vehicle at rest during the operation of the lifting mechanism. By engaging the electronic park brake before operating the lifting mechanism, even if the vehicle is parked on a slope, rolling of the vehicle may be reduced. Also, before initiating operation of the lifting mechanism, the controller may completely open a vehicle door (such as passenger door 137 or rear door 124 in FIG. 1) to which the lifting mechanism is coupled.

Operating the lifting mechanism may include the controller sending a signal to the hydraulic system or the electric motor coupled to the lifting mechanism to operate the lifting mechanism. In one example, a ramp (such as a ramp 126 in FIG. 1) may be moved from a position where it is stowed within the vehicle cabin (such as from the floor of the vehicle cabin) and unfolded to extend it from the vehicle onto a roadside via a pair of hydraulic actuators (such as the first pair of shafts 125). Once the ramp touches the road, a mobility device such as a wheel chair may roll up the ramp and enter the passenger compartment, or roll down and exit the compartment. After the wheel chair has entered/left the vehicle cabin (and has been secured in place in the cabin, if entering), the ramp may be folded and stored within the vehicle cabin via actuation of the pair of hydraulic actuators. In another example, a lift (such as a chairlift 128 in FIG. 1) may be moved from a position where it is stowed within the vehicle cabin (such as from the floor of the vehicle cabin) and then lowered from the vehicle onto a roadside via a pair of hydraulic actuators (such as the second pair of shafts 129 of FIG. 1). Once the base of the chairlift reaches the road, a mobility device such as a wheel chair may roll onto the base of the lift and then once the mobility device is on the base, the lift may be raised to the level of the floor of the vehicle cabin and the mobility device may enter the vehicle cabin from the lift base. Once the mobility device has entered the vehicle cabin and has been secured in place, the lift may be raised via the pair of hydraulic actuators and stored within the vehicle cabin. Likewise, once the mobility has rolled onto the base of the lift, the lift may be lowered from the level of the floor of the vehicle cabin to the roadside, and the mobility device may exit the vehicle cabin. One or more lifting mechanisms such as ramps and lifts may be concurrently operated by the controller to provide access to one or more mobility devices or for loading and unloading packages to and from the vehicle.

Once the lifting mechanism, such as the ramp and/or the lift, has been restored to its storage position prior, it may be inferred that the operation of the lifting mechanism has been completed. Upon completion of operation of the lifting mechanism, at 322, the electronic park brake may be disabled. In addition, the engine idle-stop operation may be resumed, wherein combustion may be suspended to shut-down the engine. In order to suspend combustion, fueling to the engine cylinders may be suspended. The controller may send a signal to one or more fuel injectors coupled to the engine cylinders to stop fuel injection to each of the cylinders. Also, the controller may send a signal to the spark plug coupled to each cylinder to disable spark. Once the combustion is suspended, the engine may spin-down to rest. The engine may be maintained at rest until restart conditions are met and/or another request for operation of a lifting mechanism is received. In addition to shutting down the engine, the transmission position may be returned to its original position (e.g., the transmission may be shifted from park back to drive, neutral, or reverse). In one example, upon completion of operation of the lifting mechanism, the transmission may be shifted to a default engine shut-down position, such as a drive position, to enable the engine to be shut down and subsequently restarted in gear. Alternatively, the transmission may be shifted from park to a position selected based on the most current operator torque demand following the operation of the lifting mechanism.

Figure 4:
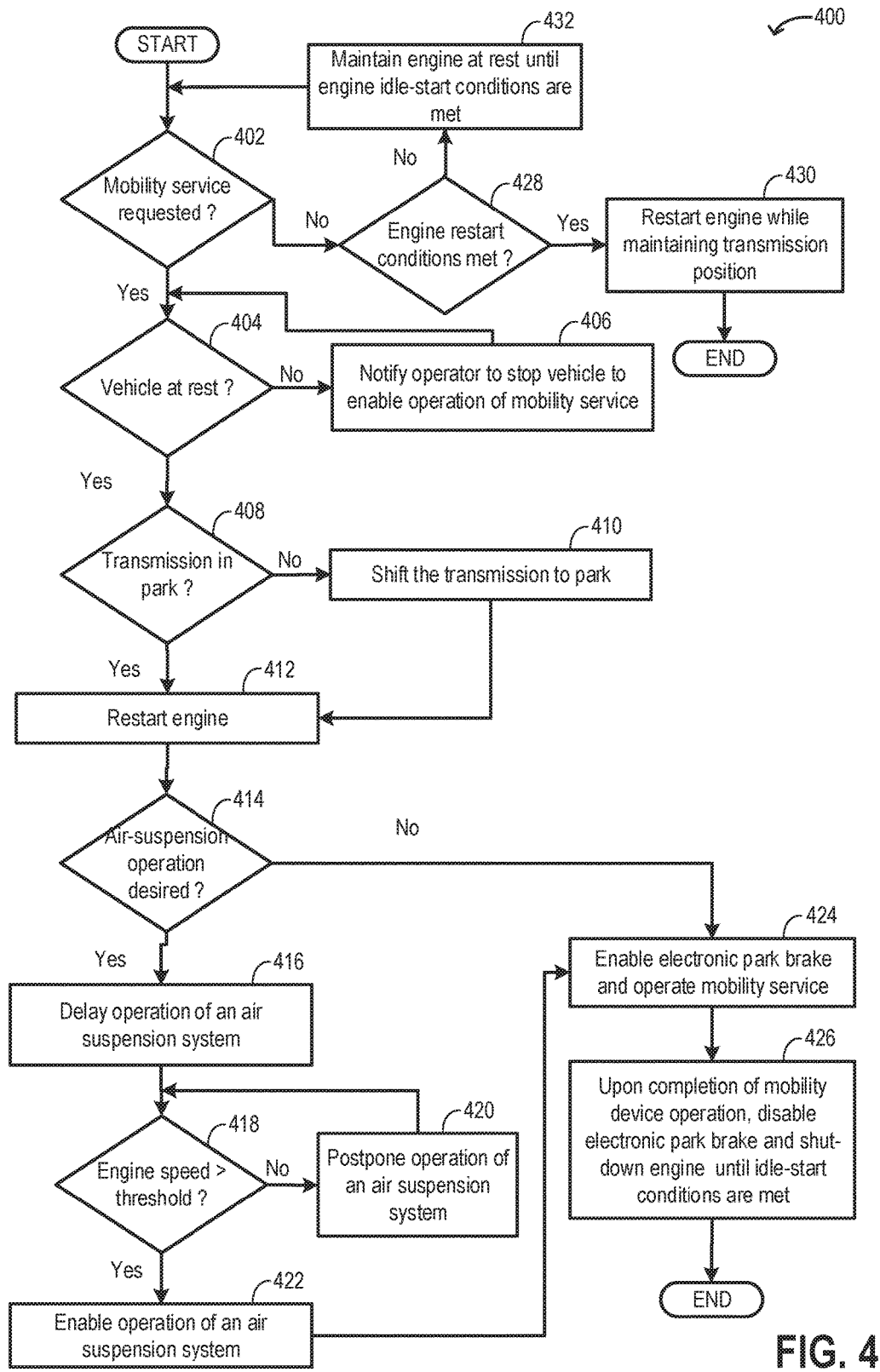
FIG. 4 shows a flow chart illustrating an example method that can be implemented to operate a lifting mechanism during an engine idle-stop.
Figure 5:
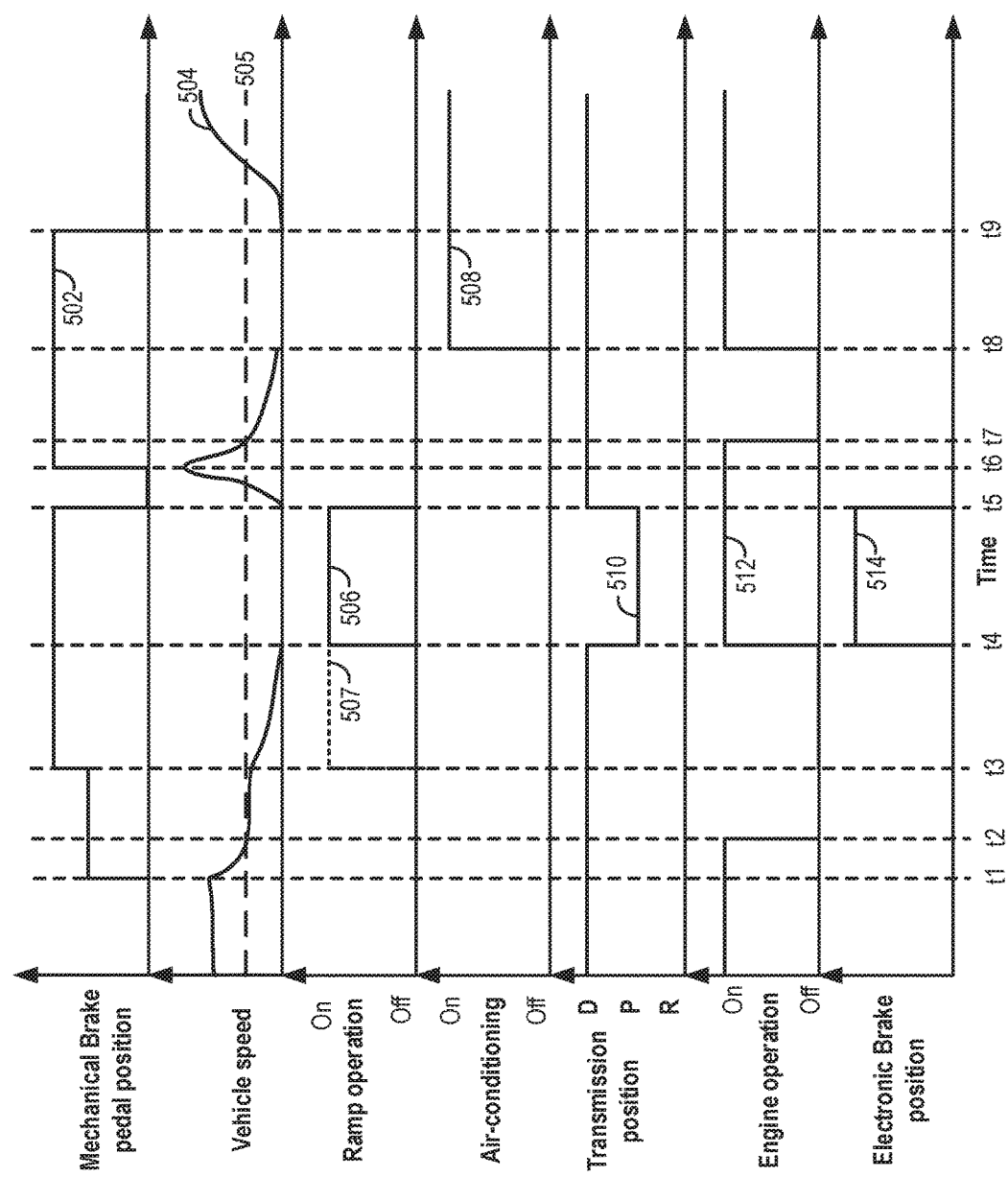
FIG. 5 shows an example operation of a mobility vehicle.

FIG. 4 shows an example method 400 for adjusting an operation of each of the engine system and the transmission system of a mobility vehicle in response a request for operation of a lifting mechanism during an engine idle-stop. The method 400 may be a continuation of method 300 and may be carried out at step 309 of method 300.

At 402, the routine includes determining if operation of a lifting mechanism has been requested during the idle-stop. As described earlier, operation of a lifting mechanism may include operation of one or more devices such as ramps and lifts coupled to the vehicle that may allow a mobility device such as a wheel chair to enter or exit the vehicle. In one example, an operator or a passenger of the mobility vehicle may request operation of a lifting mechanism by sending a command to the engine controller via a switch located in the dashboard of the vehicle cabin.

If operation of a lifting mechanism is requested, at 404, the routine includes determining if the vehicle is at rest. In one example, an engine may be at rest if the vehicle is operating at a lower than threshold vehicle speed (rolling idle-stop). The controller may determine vehicle speed based on input from a vehicle wheel speed sensor. To improve the experience of a person using the lifting mechanism to enter or exit the vehicle (such as with a wheel chair), the lifting mechanism may be operated during vehicle rest.

If it is determined that the vehicle is not at rest and is operating at a non-zero speed, at 406, the operator may be notified, via an interface, to stop the vehicle in order to enable operation of the lifting mechanism. If it is determined that the vehicle is at rest, at 408, the routine includes determining if the transmission is in park position. If the transmission is not in park position (such as transmission is in drive, neutral, or reverse position) during operation of the lifting mechanism, due to a shift in position of the operator's foot, the vehicle may move. Therefore, if it is determined that the vehicle transmission is not in park position, at 410, the controller may send a signal to the transmission system to change the transmission position from the current position to park. In one example, if the mobility vehicle is equipped with a manually shifted transmission, the operator may be notified via the interface to shift the transmission from the existing position to park.

Once the transmission is shifted to park, the routine may proceed to 412 and if at 408 it is determined that the transmission is in park, the routine may directly proceed to step 412. At 412, the controller may restart the engine. The controller may send a signal an actuator coupled to the starter motor to crank the engine using energy from the starter motor until an engine idling speed is reached. The on-board battery may provide energy to the starter motor. Upon engine restart, combustion may be resumed by initiating fueling to the engine cylinders. Also, the controller may send a signal to one or more fuel injectors coupled to the engine cylinders to restart fuel injection to each of the cylinders. Further, the controller may send a signal to the spark plug coupled to each cylinder to enable spark. Once the combustion is resumed, the engine may spin-up and the engine speed may gradually increase to an idling speed.

At 414, the routine includes determining if operation of a vehicle auxiliary system, such as an air-suspension system, is desired. Operation of the air-suspension system may be desired during an operation of a lifting mechanism such that the height of the vehicle may be adjusted for improved operation of the lifting mechanism. The adjustment to the vehicle height may be carried out by operation of an air-suspension system compressor and air springs. Power from the on-board battery may be used to operate the compressor to pump air to the air spring. During engine cranking, battery power is also used for the cranking process. As engine power is not yet available during the cranking process, the battery may not be charged while operating the starter motor. If operation of the air-suspension system is added to the battery load, the battery state of charge may rapidly decrease and may delay engine cranking. As such, due to the drop in battery state of charge, completion of engine cranking may not be possible, prolonging engine restart times and resulting in operator dissatisfaction.

Therefore, during engine restart, if operation of the air-suspension system is desired, at 416, operation of the air-suspension system may be delayed until engine cranking is completed. If an air-suspension system is already being operated, operation of the air-suspension system may be suspended to reduce the load on the battery. In one example, operation of the air-suspension system may be delayed at least until engine speed is above a threshold speed, above which engine fueling can be resumed and the engine is able to spin without assistance from the starter motor. In another example, as discussed below, the threshold speed may be an engine idling speed.

At 418, the routine includes determining if engine speed is above a threshold speed. Engine cranking may be inferred to be completed when the engine speed increases to the threshold speed, such as the engine idling speed. Engine speed may be inferred based on an input from the crankshaft sensor. As such, the threshold speed may be adjusted based on a state of charge of a battery powering the starter motor. In one example, the controller may raise the threshold speed as the state of charge decreases below a threshold state of charge. In another example, the controller may lower the threshold speed as the state of charge increases above the threshold state of charge. The controller may determine the threshold speed based on a calculation using a look-up table with the input being battery state of charge and the output being the threshold speed. If it is determined that engine speed is below the threshold, it may be inferred that power from the battery may be continued to be used for operating the starter motor. Therefore, at 420, operation of the air-suspension system may be further postponed in order to maintain the battery state of charge and facilitate improved engine cranking.

If it is determined that the engine speed has reached the threshold speed, it may be inferred that the battery state of charge is above the threshold charge and the battery may be used for operation of the air-suspension system. At 422, operation of the air-suspension system may be resumed. Also, once the engine operation is restarted, engine power may be used for charging the battery.

At 424, after restarting the engine, the controller may enable the electronic park brake and then operate the mobility device. By engaging the electronic park brake before operating the lifting mechanism, possibility of rolling of the vehicle may be reduced. Also, before initiating operation of the lifting mechanism, the controller may completely open a vehicle door (such as passenger door 137 or rear door 124 in FIG. 1) to which the lifting mechanism is coupled. If at 414 it is determined that operation of the air-suspension system is not requested, the routine may directly proceed to step 424.

The controller may send a signal to one or more of the hydraulic system and the electric motor coupled to the lifting mechanism to operate the lifting mechanism. Operating the lifting mechanism includes, unfolding the lifting mechanism from its stowed position, lowering the lifting mechanism from the vehicle passenger compartment to a road level to lift the mobility device into or out of the vehicle, and after the mobility device has been lifted onto or off the lifting mechanism, retracting the lifting mechanism from the road back to the vehicle. Details of the operation of the lifting mechanism is discussed in step 320 of method 300.

Upon completion of operation of the lifting mechanism, at 426, the electronic park brake may be disabled and if engine shut-down conditions persist, combustion may be suspended to shut-down the engine. In order to suspend combustion, fueling to the engine cylinders may be suspended and spark may be disabled. The engine may be maintained at rest until restart conditions are met and/or another request for a lifting mechanism is made. Further, in addition to engine shut-down, the transmission may be shifted from park to the transmission position prior to operation of the mobility device (prior to shifting of the transmission to park). As an example, upon completion of operation of the lifting mechanism, if it is inferred that engine idle-stop conditions are no longer met, the engine may be continued to be operated while disabling the electronic park brake and shifting the transmission to the prior position.

If at 402 it is determined that operation of a lifting mechanism is not requested during the idle-stop, at 428, the routine includes determining if engine restart conditions are met. In one example, engine idle-start (restart) conditions following an engine idle-stop may include an increase in engine load. In one example, the controller may determine if the brake pedal is released. The accelerator pedal position may also be determined, for example via a pedal position sensor, to determine whether the accelerator pedal has been engaged in addition to the release of the brake pedal. The status of the air conditioner may be checked to verify whether a request has been made to restart, as may be made when air conditioning is desired. The SOC of battery may be estimated to estimate if it is below a predetermined threshold. In one example, it may be desired that battery be at least 30% charged. Accordingly, engine starting may be requested to charge the battery to a desired value.

The engine restart conditions may further include, a request from an emission control device to restart the engine. In one example, the emission control device temperature may be estimated and/or measured by a temperature sensor, and if the temperature is below a predetermined threshold, an engine restart may be requested. The vehicle speed may be estimated and assessed whether it is above a predetermined threshold. For example, if the vehicle speed is greater than a threshold (e.g., 3 mph) an engine start may be requested. It may be determined whether the electrical load of the engine is above a predetermined threshold, in response to which an engine start is requested (e.g., to reduce draining of the battery). In one example, the electrical load may comprise one of various user operated accessory devices (such as a mobile phone, laptop, etc.), a defroster, windshield wipers, a music system, navigation system, electrically powered air-conditioning, etc.

If it is determined that the engine restart conditions have not been met, at 432, the engine may be maintained shut down and at rest, and combustion may not be resumed. The engine may be maintained at rest until conditions for engine restart are met and/or a request for operation of a lifting mechanism is received.

If it is determined that engine restart conditions are met, at 430, the engine may be restarted. Upon engine restart, combustion may be resumed by initiating fueling to the engine cylinders. The controller may send a signal an actuator coupled to the starter motor to crank the engine using energy from the starter motor until an engine idling speed is reached. The on-board battery may provide energy to the starter motor. Also, the controller may send a signal to one or more fuel injectors coupled to the engine cylinders to restart fuel injection to each of the cylinders. Further, the controller may send a signal to the spark plug coupled to each cylinder to enable spark. During engine restart, the transmission position may be maintained at the current transmission position (such as drive, neutral, or reverse). In this way, in response to a request for operation of an engine auxiliary system such as the air-conditioning system while the engine is at rest in the idle-stop, the transmission may be maintained in drive, the electronic brake may be maintained in disabled position, the engine may be restarted by cranking the engine via the electric motor with the transmission in drive, and then the air-conditioning system may be operated. While restarting the engine upon initiation of operation of one or more auxiliary systems, such as a defroster, windshield wipers, a music system, navigation system, etc., the engine may be restarted without changing a current transmission position and without enabling the electronic parking brake. Also, operation of the auxiliary system may not be delayed until the vehicle comes to rest and the system may be operated even if the vehicle is at motion. In this way, upon engine restart in response to a request for operation of a lifting mechanism, the transmission position may be changed from a current position to park and the engine may be restarted with the transmission in park, while upon engine restart in response to any other engine restart condition being met (such as operation of an air-conditioning system), the transmission position may be maintained at the current position and the engine may be restarted with the transmission in the current position (e.g., in drive).

Further, as described before, during cranking of the engine upon engine restart, operation of auxiliary devices such as the air-suspension system may be disabled such that power of the on-board battery may be solely supplied to the starter motor for use during cranking of the engine. If operation of an air-suspension system is ongoing during the engine restart, the ongoing operation of the air-suspension system (via the electric motor) may be suspended until engine cranking speed is above a threshold speed and a state of charge of the battery is above a threshold charge, and thereafter, operation of the air-suspension system may be resumed. By using the battery power solely for engine cranking, the cranking process may be accelerated and driver experience may be improved.

In this way, during a first engine restart condition, responsive to a request for operating a lifting mechanism, an engine may be restarted with a transmission in park and an electronic parking brake enabled before operating the lifting mechanism, and during a second engine restart condition, responsive to a request for operating an air-conditioning system, the engine may be restarted with the transmission in drive and the electronic parking brake disabled before operating the air-conditioning system.

FIG. 5 shows an example operating sequence 500 illustrating operation of a mobility vehicle during an engine idle-stop. The horizontal (x-axis) denotes time and the vertical markers t1-t9 identify significant times in generation of the engine sound.

The first plot, line 502, shows a position of the mechanical brake pedal. The second plot, line 504, shows variation in vehicle speed over time as estimated via a wheel speed sensor. Dotted line 505 denotes a threshold vehicle speed below which engine may be shut-down. The third plot, line 506, shows an operation of a ramp (such as ramp 126 in FIG. 1) enabling a wheelchair-bound passenger to enter and exit the vehicle. Dotted line 507 shows a request for operation of the ramp. The fourth plot, line 508, shows operation of an air-conditioning system. The fifth plot, line 510, shows three possible transmission positions, such as drive, park, and rear. The sixth plot, line 512, shows engine operation, specifically if the engine is combusting (On) or is shut-down (Off). The seventh plot, line 514, shows a position of the electronic park brake. The electronic park brake may be different from the mechanical brake, while the mechanical brake is actuated by an operator, the electronic park brake is engaged via the controller irrespective of the position of the mechanical brake.

Prior to time t1, the brake pedal is completely disengaged, the electronic park brake is disengaged, and the engine is operating at a vehicle speed higher than the threshold speed 505. At this time, operation of the ramp is not requested and also the air-conditioning system is not in use (in Off state). The transmission is in drive position and engine cylinder combustion is carried out to generate power used to propel the vehicle.

At time t1, the brake pedal is partially depressed by the operator and in response to the change in brake pedal position, between time t1 and t2, there is a decrease in vehicle speed. At time t2, the vehicle speed has reduced to the threshold speed 505. In response to the reduction of vehicle speed to the threshold speed, at time t2, idle-stop conditions are confirmed, an engine idle-stop is initiated to improve fuel efficiency and emissions quality, and engine combustion is suspended. In order to initiate an idle-stop, fueling (to cylinders) may be disabled, and spark may be disabled. Between time t2 and t3, the vehicle speed remains below the threshold speed 505 and the engine spins down to rest, for example, the engine coasts to rest.

At time t3, the brake pedal is fully depressed and in response to the further change in brake pedal position, between time t3 and t4, there is a further decrease in vehicle speed. Also at time t3, there is a request for operation of the ramp. However, in spite of the engine being at rest, as the vehicle is travelling at a non-zero velocity, the ramp is not allowed to be operated at this time. The operator is notified via an interface that operation of the ramp will be delayed until the vehicle comes to absolute rest.

At time t4, the vehicle comes to absolute rest. The transmission position is automatically shifted from drive to park via the controller and further the electronic parking brake is engaged via the controller to maintain the vehicle at rest. In order to supply power for operation of the ramp, the engine is restarted at time t4 and engine combustion is resumed. Between time t4 and t5, the vehicle is at rest and the ramp is operated. Operation of the ramp includes opening a vehicle door via which the ramp is accessible, unstowing the ramp from its stowed position in the vehicle cabin, unfolding and extending the ramp from the vehicle onto the curbside of the road, and then once a wheel chair bound passenger has entered the vehicle cabin and the wheelchair is secured in place, folding the ramp back to its stowed position within the vehicle cabin and closing the door.

At time t5, the operator releases the mechanical brake pedal. Also, as operation of the ramp is completed, in response to the release of the brake pedal, in order to move the vehicle, the transmission position is shifted from park to drive, and the electronic parking brake is also disengaged by the controller. Between time t5 and t6, the vehicle speed increases steadily based on operator torque demand and engine cylinder combustion is continued.

At time t6, the operator completely depressed the brake pedal again. In response to the change in brake position, between time t6 and t7, the vehicle speed decreases to the threshold speed 505. At time t7, in response to the lower than threshold 505 vehicle speed, the engine is shut down and combustion is suspended. Between time t7 and t8, the vehicle speed continues to decrease while the engine spins to rest and stays at rest thereafter.

At time t8, the air-conditioning system may be enabled in response to a cooling demand by the vehicle operator. In response to the initiation of operation of the air-conditioning system, the engine may be restarted and combustion may be resumed to supply power to the air-conditioning system and operate an air conditioning compressor. However, since at time t8, the ramp is not being operated, the vehicle transmission is maintained at the current (drive) position (and is not shifted to park as previously done before operating the ramp at time t4) and the electronic parking brake is not engaged. Between time t8 and t9, the vehicle is at rest, the ramp is not operating, and engine combustion is continued to power the air-conditioning system. At time t9, the brake pedal is completely released and the vehicle speed is increased.

After time t9, the engine power is used for each of vehicle propulsion and air-conditioning operation. Thus, during an engine idle-stop, in response to a request for operating the ramp, a transmission position is shifted from the drive to park before restarting the engine, while in response to operation of the air-conditioning system, the transmission position is maintained in drive (not shifted to park) before restarting the engine.

In this way, in response to a request for operating a lifting mechanism, by shifting the transmission gear to park, via a controller, and then operating the lifting mechanism, undesired vehicle movement may be reduced during operation of the lifting mechanism. By engaging the electronic park brake before operating the lifting mechanism, possibility of rolling of the vehicle may be reduced. The technical effect of postponing engine shutdown in response to engine shutdown conditions being met and operation of a lifting mechanism being requested is that engine power may be effectively used for operation of the lifting mechanism. In this way, by shifting transmission to park and operating the engine during operation of then lifting mechanism, the overall experience of the passenger using the lifting service may be improved.

An example method for a vehicle comprises: responsive to a driver request for operating a lifting mechanism coupled to the vehicle received while an engine is at rest, shifting a transmission into a park position, restarting the engine, and then operating the lifting mechanism. Any preceding example further comprising, additionally or optionally, after operating the lifting mechanism, shifting the transmission into a driving gear and shutting down the engine with the transmission in gear. In any or all of the preceding examples, additionally or optionally, wherein the lifting mechanism includes one or more of a ramp and a chairlift to assist a mobility device to be lifted into or out of the vehicle. In any or all of the preceding examples, additionally or optionally, wherein operating the lifting mechanism includes, lowering the lifting mechanism from the vehicle to a road to lift the mobility device into or out of the vehicle, and after the mobility device has been lifted onto or off the lifting mechanism, retracting the lifting mechanism from the road back to the vehicle, each of the lowering and the retracting of the lifting mechanism powered via one or more of a hydraulic system and an electric motor of the vehicle. Any or all of the preceding examples further comprising, additionally or optionally, responsive to the driver request for operating the lifting mechanism received while the engine is running and engine idle-stop conditions are met, shifting the transmission into the park position, operating the lifting mechanism, and delaying the engine idle-stop until the operating of the lifting mechanism has been completed. In any or all of the preceding examples, additionally or optionally, wherein operating the lifting mechanism includes initiating the operating after the vehicle is brought to rest. Any or all of the preceding examples further comprising, additionally or optionally, prior to operating the lifting mechanism actuating, via a controller, an electronic parking brake distinct from a driver-actuated mechanical brake, the electronic parking brake actuated independent of driver braking input. Any or all of the preceding examples further comprising, additionally or optionally, disabling, via the controller, the electronic parking brake after the operating of the lifting mechanism is completed. Any or all of the preceding examples further comprising, additionally or optionally, responsive to a driver request for air-conditioning while the engine is at rest, maintaining the transmission in the driving gear, restarting the engine with the transmission maintained in the driving gear, and then operating a compressor of the air-conditioning system. In any or all of the preceding examples, additionally or optionally, restarting the engine includes cranking the engine via a starter motor, the method further comprising, responsive to a request for operation of an air-suspension system during the engine restarting, delaying operation of the air-suspension system until engine cranking speed is above a threshold speed, the threshold speed adjusted based on a state of charge of a battery powering the starter motor, the threshold speed raised as the state of charge decreases below a threshold state of charge.

Another example vehicle method comprises: during a first engine restart condition, responsive to a request for operating a lifting mechanism, restarting an engine with a transmission in park and an electronic parking brake enabled before operating the lifting mechanism, and during a second engine restart condition, responsive to a request for operating an air-conditioning system, restarting the engine with the transmission in drive and the electronic parking brake disabled before operating the air-conditioning system. In any preceding example, additionally or optionally, during each of a first engine shut-down immediately before the first engine restart condition and a second engine shut-down immediately before the second engine restart condition, the engine was shut-down with the transmission in drive, and wherein restarting the engine with the transmission in park includes shifting the transmission from drive to park and wherein restarting the engine with the transmission in drive includes maintaining the transmission in drive. Any or all of the preceding examples further comprising, additionally or optionally, upon completion of operation of the lifting mechanism, disabling the electronic parking brake, and selecting a transmission position based on operator torque demand following the operation of the lifting mechanism. In any or all of the preceding examples, additionally or optionally, the lifting mechanism is coupled to a body of the vehicle, and enables a wheelchair bound passenger to enter and exit the vehicle, the lifting mechanism actuatable vertically and/or horizontally relative to the body of the vehicle. Any or all of the preceding examples further comprising, additionally or optionally, during a first engine idle-stop condition following the first engine restart condition, in response to a request for operating the lifting mechanism, delay shutting down the engine until the lift mechanism has been operated, and during a second idle-stop condition following the first engine restart condition, immediately shutting down the engine. Any or all of the preceding examples further comprising, additionally or optionally, during the first idle-stop condition, responsive to the request, shifting the transmission to park and enabling the electronic parking brake before operating the lifting mechanism, and then after operating the lifting mechanism, shutting down the engine. In any or all of the preceding examples, additionally or optionally, wherein operation of the lifting mechanism during each of the first restart condition and the first idle-stop condition includes operating the lifting mechanism via an on-board hydraulic system powered by engine torque while the vehicle is at rest.

In yet another example, a vehicle system comprises: a vehicle including a vehicle cabin; a lifting mechanism coupled to the vehicle cabin, a hydraulic system coupled to the lifting mechanism, a dashboard including a switch electronically coupled to the lifting mechanism, a powertrain including an engine and a transmission, the engine coupled to an electric motor, an air-suspension system, a mechanical parking brake, an electronic parking brake, an air-conditioning system, and a controller with computer readable instructions stored on non-transitory memory for: in response to the switch being activated to request operation of the lifting mechanism while the engine is at rest in idle-stop, shifting the transmission from drive to park, enabling the electronic parking brake to bring the vehicle to rest, restarting the engine by cranking the engine via the electric motor, operating the lifting mechanism via the hydraulic system after engine speed is above a threshold speed, and upon completion of the operating, shutting down the engine and returning the engine to idle-stop. In any preceding example, additionally or optionally, the controller contains further instructions for: in response to a request for operation of the air-conditioning system while the engine is at rest in the idle-stop, maintaining the transmission in drive, maintaining the electronic brake disabled, restarting the engine by cranking the engine via the electric motor with the transmission in drive, and then operating the air-conditioning system. Any or all of the preceding examples further comprising, additionally or optionally, a battery providing electrical power to the electric motor, wherein restarting the engine by cranking includes, suspending an ongoing operation of the air-suspension system via the electric motor until engine cranking speed is above a threshold speed and a state of charge of the battery is above a threshold charge, and thereafter, resuming operation of the air-suspension system via the electric motor.

In a further representation, the vehicle is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
responsive to a driver request for operating a lifting mechanism coupled to the vehicle received while an engine is at rest,
shifting a transmission into a park position;
restarting the engine; and
then operating the lifting mechanism.

2. The method of claim 1, further comprising, after operating the lifting mechanism, shifting the transmission into a driving gear and shutting down the engine with the transmission in gear.

3. The method of claim 2, further comprising, responsive to a driver request for air-conditioning while the engine is at rest, maintaining the transmission in the driving gear, restarting the engine with the transmission maintained in the driving gear, and then operating a compressor of the air-conditioning system.

4. The method of claim 1, wherein the lifting mechanism includes one or more of a ramp and a chairlift to assist a mobility device to be lifted into or out of the vehicle.

5. The method of claim 4, wherein operating the lifting mechanism includes lowering the lifting mechanism from the vehicle to a road to lift the mobility device into or out of the vehicle, and after the mobility device has been lifted onto or off the lifting mechanism, retracting the lifting mechanism from the road back to the vehicle, each of the lowering and the retracting of the lifting mechanism powered via one or more of a hydraulic system and an electric motor of the vehicle.

6. The method of claim 1, further comprising, responsive to the driver request for operating the lifting mechanism received while the engine is running and engine idle-stop conditions are met, shifting the transmission into the park position, operating the lifting mechanism, and delaying engine idle-stop until the operating of the lifting mechanism has been completed.

7. The method of claim 1, wherein operating the lifting mechanism includes initiating the operating after the vehicle is brought to rest.

8. The method of claim 7, further comprising, prior to operating the lifting mechanism actuating, via a controller, an electronic parking brake distinct from a driver-actuated mechanical brake, the electronic parking brake actuated independent of driver braking input.

9. The method of claim 8, further comprising, disabling, via the controller, the electronic parking brake after the operating of the lifting mechanism is completed.

10. The method of claim 1, wherein restarting the engine includes cranking the engine via a starter motor, the method further comprising, responsive to a request for operation of an air-suspension system during the engine restarting, delaying operation of the air-suspension system until engine cranking speed is above a threshold speed, the threshold speed adjusted based on a state of charge of a battery powering the starter motor, the threshold speed raised as the state of charge decreases below a threshold state of charge.

11. A vehicle method, comprising:
during a first engine restart condition, responsive to a request for operating a lifting mechanism, restarting an engine with a transmission in park and an electronic parking brake enabled before operating the lifting mechanism; and
during a second engine restart condition, responsive to a request for operating an air-conditioning system, restarting the engine with the transmission in drive and the electronic parking brake disabled before operating the air-conditioning system.

12. The method of claim 11, wherein during each of a first engine shut-down immediately before the first engine restart condition and a second engine shut-down immediately before the second engine restart condition, the engine was shut-down with the transmission in drive, and wherein restarting the engine with the transmission in park includes shifting the transmission from drive to park and wherein restarting the engine with the transmission in drive includes maintaining the transmission in drive.

13. The method of claim 12, further comprising, upon completion of operation of the lifting mechanism, disabling the electronic parking brake, and selecting a transmission position based on operator torque demand following the operation of the lifting mechanism.

14. The method of claim 11, wherein the lifting mechanism is coupled to a body of a vehicle, and the lifting mechanism is configured to enable a wheelchair bound passenger to enter and exit the vehicle, the lifting mechanism actuatable vertically and/or horizontally relative to the body of the vehicle.

15. The method of claim 14, further comprising, during a first engine idle-stop condition following the first engine restart condition, in response to a request for operating the lifting mechanism, delay shutting down the engine until the lifting mechanism has been operated, and during a second engine idle-stop condition following the first engine restart condition, immediately shutting down the engine.

16. The method of claim 15, further comprising, during the first engine idle-stop condition, responsive to the request, shifting the transmission to park and enabling the electronic parking brake before operating the lifting mechanism, and then after operating the lifting mechanism, shutting down the engine.

17. The method of claim 15, wherein operation of the lifting mechanism during each of the first engine restart condition and the first engine idle-stop condition includes operating the lifting mechanism via an on-board hydraulic system powered by engine torque while the vehicle is at rest.

18. A vehicle system comprising:
a vehicle including a vehicle cabin;
a lifting mechanism coupled to the vehicle cabin;
a hydraulic system coupled to the lifting mechanism;
a dashboard including a switch electronically coupled to the lifting mechanism;
a powertrain including an engine and a transmission, the engine coupled to an electric motor;
an air-suspension system;
a mechanical parking brake;
an electronic parking brake;
an air-conditioning system; and
a controller with computer readable instructions stored on non-transitory memory for:

in response to the switch being activated to request operation of the lifting mechanism while the engine is at rest in idle-stop;
shifting the transmission from drive to park;
enabling the electronic parking brake to bring the vehicle to rest;
restarting the engine by cranking the engine via the electric motor;
operating the lifting mechanism via the hydraulic system after engine speed is above a threshold speed; and
upon completion of the operating, shutting down the engine and returning the engine to idle-stop.

19. The vehicle system of claim 18, wherein the controller contains further instructions for:
in response to a request for operation of the air-conditioning system while the engine is at rest in the idle-stop, maintaining the transmission in drive, maintaining the electronic parking brake disabled, restarting the engine by cranking the engine via the electric motor with the transmission in drive, and then operating the air-conditioning system.

20. The vehicle system of claim 18, further comprising a battery providing electrical power to the electric motor, wherein restarting the engine by cranking includes suspending an ongoing operation of the air-suspension system via the electric motor until engine cranking speed is above a threshold speed and a state of charge of the battery is above a threshold charge, and thereafter, resuming operation of the air-suspension system via the electric motor.

* * * * *